Figure 1:
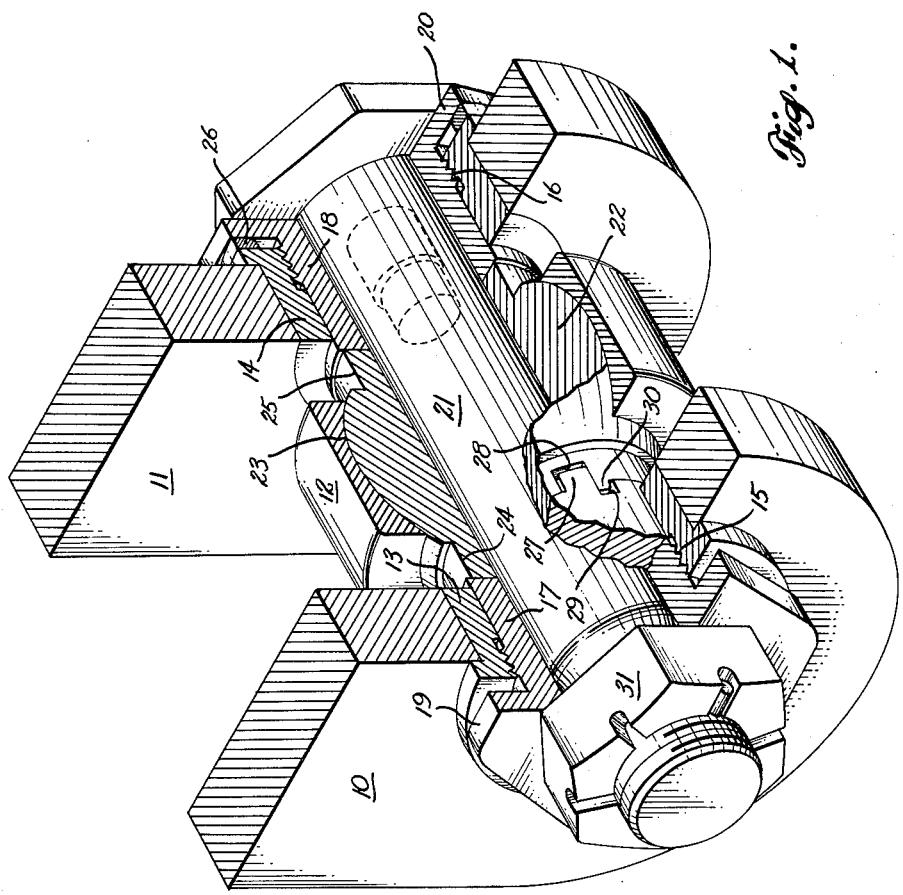

Aug. 3, 1965  R. H. STEIDL  3,198,563
ADJUSTABLE HINGE
Filed Nov. 5, 1962  2 Sheets-Sheet 1

INVENTOR.
ROBERT H. STEIDL
BY
AGENT

Aug. 3, 1965   R. H. STEIDL   3,198,563
ADJUSTABLE HINGE
Filed Nov. 5, 1962   2 Sheets-Sheet 2
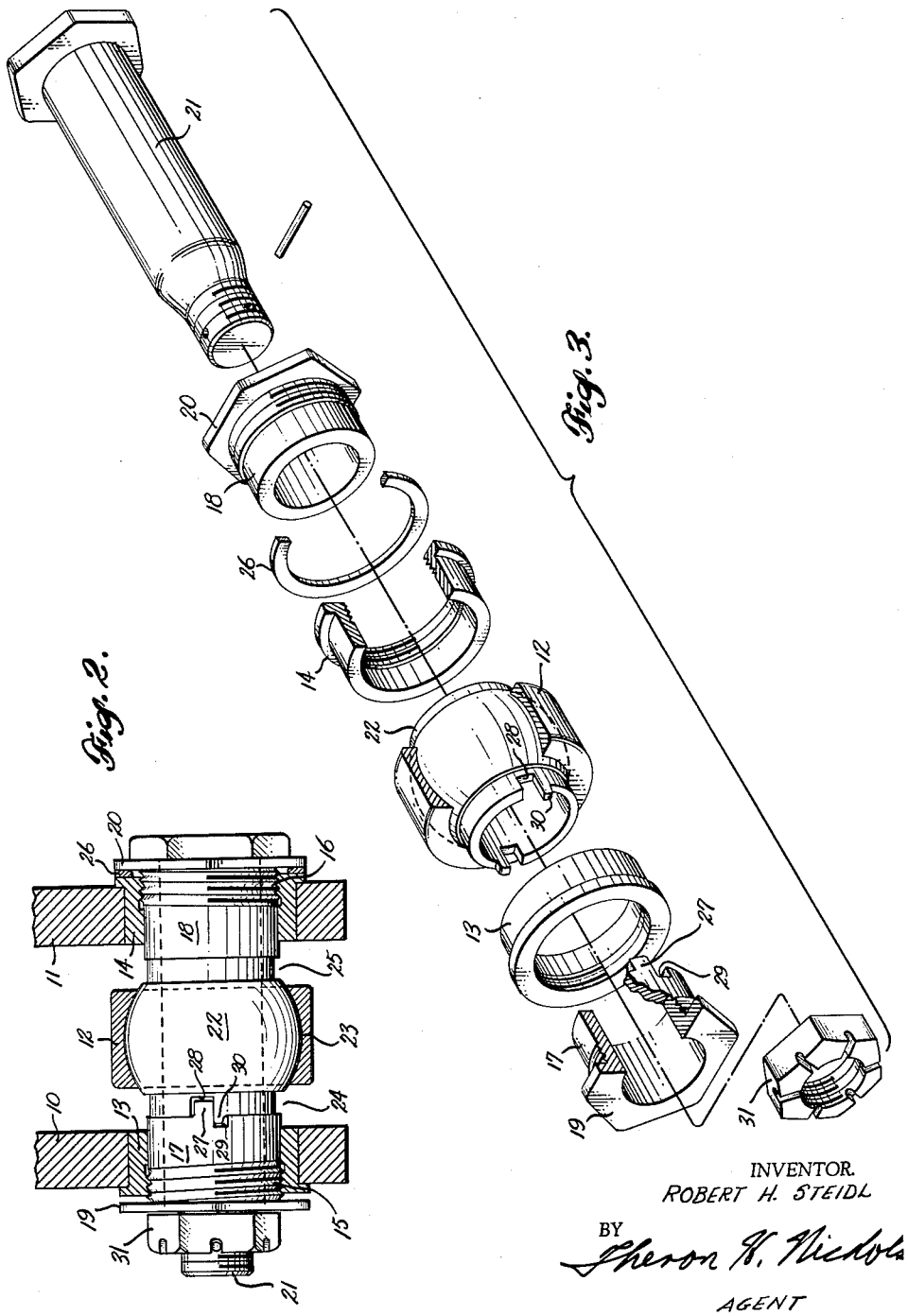
INVENTOR.
ROBERT H. STEIDL
BY
AGENT United States Patent Office 3,198,563
Patented Aug. 3, 1965

3,198,563
ADJUSTABLE HINGE
Robert H. Steidl, Seattle, Wash., assignor to The Boeing Company, Seattle, Wash., a corporation of Delaware
Filed Nov. 5, 1962, Ser. No. 235,496
11 Claims. (Cl. 287—96)

This invention relates to an improved hinge construction. More particularly, the invention relates to a method and at least one mechanism which, among other features, prevents rotation between a hinge bolt and a cylindrical element or bearing inner race which is supported by a hinge bolt.

For ease of illustration only, the invention is exemplified by the pivotal mounting on an airplane between a movable horizontal tail surface and a stationary vertical stabilizer. The horizontal tail is adjustable in pitch to provide longitudinal control and trim for the aircraft. The pivotal mounting comprises a pair or more hinges. Each of these hinges comprises a bearing outer race mounted in a vertical stabilizer, an inner bearing race, bushings mounted in a horizontal tail surface spar, and a hinge bolt passing through the bushings and bearing inner race for rotatably supporting the movable horizontal tail surface.

With an ordinary hinge, oscillation of the horizontal tail would transmit a torque through the bearing causing the inner race to rotate on the hinge bolts. This rotation would cause scoring of the hinge bolt and consequently provides a potential area for structural failure.

Furthermore, the horizontal tail surface must be capable of lateral positioning, so as to prevent binding or jamming with the vertical stabilizer structure. Upon proper lateral adjustment, a positive position must be maintained. It is also necessary that the hinge be capable of accepting thrust or axial loads produced by the horizontal tail surface. These latter two capabilities are generally provided for through the use of shims. However, the shim method involves problems of maintenance, service and limited adjustability.

A primary object of this invention is to provide a method for preventing relative rotation between a bearing inner race mounted on a hinge bolt and lugs mounted on each end of the bolt.

Another primary object of this invention is to provide a hinge comprising a bearing inner race mounted on a hinge bolt wherein relative rotation between the race and the hinge bolt is prevented.

Another object of this invention is to provide a hinge that will permit close tolerance lateral adjustment between a cylindrical element mounted on a hinge bolt and supports or lugs mounted on each end of the bolt, without the use of shims.

An additional object of this invention is to provide a hinge having means by which a cylindrical element may be positively positioned relative to its supports after lateral adjustment is completed.

A further object of this invention is to provide a hinge having a bearing inner race through which axial loads may be transmitted without the use of shims.

Other objects and various advantages of the disclosed adjustable hinge assembly will be apparent from the following detailed description, together with the accompanying drawings, submitted for purposes of illustration only and not intended to define the scope of the invention, reference being had for that purpose to the subjoined claims.

Briefly, the disclosed invention comprises a hinge assembly having a pair of bushings mounted in a pair of spaced apart lugs. These bushings are of opposite thread and one of these engages a cylindrical element, such as a bearing inner race, mounted between the bushings. The engagement prevents the bearing inner race from rotating on the hinge bolt which passes through the bushings, bearing inner race, and lugs. The bushings threadably engage the lugs and may be so adjusted as to position the inner race at a particular lateral position and fix the inner race at this position after the hinge is assembled. The threads of the bushings and lugs are designed to receive axial loads. The engagement which prevents rotation comprises a tab on one of the bushings which interconnects with a notch in the bearing inner race. This tab is prevented from jamming against the end portion of the cylindrical extension on the inner race as the bushing is threaded into the lug by a small tab on the cylindrical extension which contacts the tab on the bushing causing the inner race to rotate as the bushing tab moves into the bearing inner race notch.

The drawings diagrammatically illustrate by way of example, not by way of limitation, one form of the invention which comprises several novel features hereinafter set forth wherein like reference numerals designate corresponding parts in the several views in which:

FIG. 1 is a perspective view of the hinge, as assembled;
FIG. 2 is a sectional view of the hinge; and
FIG. 3 is an exploded view of the parts of the hinge.

The new method of the invention for preventing relative rotation between a bearing inner race and a pair of lugs is to interconnect the bearing inner race to one of the bushings mounted in one of the lugs by means of a tab and notch, and to prevent the two bushings from rotating relative to the lugs. At least one embodiment for carrying out this new method is disclosed hereinafter.

The construction may be exemplified by lugs 10 and 11, as shown in FIG. 1, which are fixedly connected to a spar of a movable horizontal tail surface forming a part thereof and a spherical bearing outer race 12 which is mounted in and supported by or in effect integral with a stationary vertical stabilizer.

FIG. 2 shows a more detailed view of the hinge in section. External bushings 13 and 14 are installed in the lugs 10 and 11, respectively, with a shrink fit. The left-hand external bushing 13 has right-handed internal threads 15, and the right hand external bushing 14 has left-handed internal threads 16. Internal bushings 17 and 18 are threaded so as to engage the respective internal threads 15 and 16 of the external bushing 13 and 14, respectively. Each of these internal bushings have an outer end portion having a larger diameter or head, 19 and 20, respectively. While the external bushings 13 and 14 are shown fixedly connected to their respective lugs 10 and 11, they may be integral with the lugs wherein the internal bushings 17 and 18 would be the sole bushing means.

Bushings 17 and 18 are supported by a bolt 21 at its ends. Mounted on the bolt intermediate its ends is a cylindrical element means or bearing inner race 22 comprising a spherical bearing portion 23 between two cylindrical extensions 24 and 25. The spherical bearing inner race 22 is mounted in the spherical bearing outer race 12 for being supported thereby as well as for supporting the rest of the hinge structure.

A spacer washer 26, of a predetermined thickness, is illustrated positioned between the right internal bushing head 20 and the right external bushing 14 whereby, with bushing 17 being the same length as bushing 18, a like space will appear between the left internal bushing head 19 and the left external bushing 13 when the hinge is finally assembled. This space insures that the inner end portion of internal bushing 17 will butt against cylindrical extension 24, after assembly, thus preventing any play from entering into the system. The tight interconnection between internal bushings 17 and 18 and the bearing inner race 22 provide a hinge whereby the axial component of a hinge load may be transmitted through the spherical bearing inner race to the bushing threads 15 and 16. The spacer washer 26, also provides a means for accurate lateral positioning of the inner race 22 between the lugs 10 and 11. A shim, being a thin strip of metal to be added after assembly for adjustment, is not required when the washer 26 is used.

The bolt 21 passes through the internal bushings 17 and 18, and the bearing inner race 22. The left hand internal bushing 17 has a tab 27 protruding from the inner end portion. After assembly, this tab 27 engages a notch 28 positioned on the cylindrical extension 24 of the inner race 22. The internal bushing 17 also has a smaller notch 29 positioned immediately adjacent to tab 27 and forward of the tab with respect to the direction in which the bushing rotates as it is threaded into its external bushing. This notch 29 is positioned so as to accept a small tab 30 located on cylindrical extension 24 immediately adjacent to notch 28. As is seen in FIG. 2, the tab 27 and notch 28 are engaged after assembly, and similarly, the smaller tab 30 and notch 29 are engaged.

To assemble the hinge, the spacer 26 is placed over the internal bushing 18 and the bushing is fully threaded into lug 11. Internal bushing 17 is threaded into external bushing 13 a short distance, allowing inner race 22 to be easily positioned between the two internal bushings and aligned so that bolt 21 may pass therethrough. Bushing 17 is then threaded further allowing tab 27 to contact the smaller tab 30 which causes inner race 22 to rotate on the bolt 21 in the same direction as bushing 17 rotates. If there is only one tab and notch means, the length of tab 30 must be greater than the distance that the bushing 17 advances during one full rotation of said bushing. This will prevent the tab 27 from contacting the end portion of cylindrical extension 24 without contacting the tab 30. If more than one tab and notch means is located on the bushing 17 and cylindrical extension 24, the length of tab 30 should be greater than the distance which bushing 17 advances during one full rotation divided by the number of tab and notch means. Tab 30 provides a means for preventing jamming since without tab 30 the tab 27 would bind against the end of cylindrical extension 24 thereby preventing assembly. Since tab 27 is aligned with notch 28 after the tab contacts the smaller tab 30, advancement and rotation of bushing 17 causes tab 27 to proceed into notch 28 until the end portion of bushing 17 butts against the adjacent end of cylindrical extension 24. It may therefore be seen, that jamming of the tab 27 against the end portion of inner race 22 is prevented. After the inner end portion of bushing 17 butts against the end portion of inner race 22, the nut 31 is threaded onto the bolt 21 and tightened.

The assembled hinge, as thus described, will prevent rotation of the bearing inner race 22 on the hinge bolt 21. This non-rotation capability is provided by tab and notch interconnecting means which prevents rotation between inner race 22 and internal bushing 17. Rotation preventing means also comprises the bolt 21 and nut 31 which prevents bushings 17 and 18 from moving apart. Thus, any rotation induced in internal bushing 17, through a torque transmitted through the bearing inner race 22, which would tend to unscrew the internal bushing 17 and force the two internal bushings 17 and 18 apart, is restrained. Bushing 17 will be restrained from screwing further into bushing 13, by contact of the inner end portion of bushing 17 with the end portion of cylindrical extension 24. Finally, since a gap exists between head 19 and bushing 13, after assembly, the internal bushings 17 and 18, the bearing inner race 22 and the nut and bolt means 21 and 31 would tend to rotate relative to the external bushings 13 and 14, and therefore relative to the lugs 10 and 11. However, internal bushings 17 and 18 have opposite threads thereby preventing any rotation of the bushings, relative to the lugs. The combination of the three foregoing features in this embodiment provides a method and at least one mechanism for preventing relative rotation between the cylindrical element 22 and the lugs 10 and 11.

While only one method and one embodiment of carrying out the method of the invention have been shown in the accompanying drawings, it will be evident that various other modifications are possible in the arrangement and construction of the disclosed adjustable hinge assembly without departing from the scope of the invention.

I claim:
1. The combination comprising:
  (a) a pair of spaced lugs,
  (b) first bushing means mounted in one of said spaced lugs,
  (c) cylindrical element means positioned between said spaced lugs, and
  (d) means for preventing relative rotation between said cylindrical element means and said lugs,
  (e) said rotation preventing means comprising at least tab and notch interconnecting means between said cylindrical element means and said first bushing means.
2. The combination recited in claim 1 wherein said rotation preventing means additionally comprises:
  (a) means for supporting said cylindrical element means,
  (b) said supporting means comprising nut and bolt means interconnecting said bushing means and said cylindrical element means.
3. The combination recited in claim 1 wherein said rotation preventing means additionally comprises:
  (a) second bushing means mounted in the other of said lugs,
  (b) first threads between said first bushing means and said one lug, and
  (c) second threads between said second bushing means and said other lug,
  (d) said first threads being opposite to said second threads.
4. The combination comprising:
  (a) a pair of spaced lugs,
  (b) first bushing means mounted in one of said spaced lugs,
  (c) second bushing means mounted in the other of said spaced lugs,
  (d) cylindrical element means positioned between said spaced lugs,
  (e) means for preventing relative rotation between said cylindrical element means and said lugs,
  (f) said rotation preventing means comprising at least first threads between said first bushing means and said one lug, and second threads between said second bushing means and said other lug, said first threads being opposite to said second threads.
5. The combination comprising:
  (a) a pair of spaced lugs, said lugs each having an aperture therethrough, said apertures of said lugs being threaded, and said threaded apertures being oppositely threaded,
  (b) bushing means for engaging each of said threaded apertures, one of said bushing means having at least one tab,
  (c) cylindrical element means having at least one notch on one end thereof, said notch and said tab being interconnected, said cylindrical element means being positioned between said oppositely threaded lugs,
  (d) means for supporting said cylindrical element means between said lugs, and
  (e) said supporting means being cooperative with said opposite threads in said lugs and said notch and tab to form means for preventing relative movement between said cylindrical element means and said lugs.

6. A hinge comprising the combination:
  (a) a pair of spaced lugs, said lugs each having an aperture therethrough, said apertures being disposed in axial alignment,
  (b) external bushing means positioned in said two axially aligned apertures, each of said external bushing means having an aperture, each of said bushing apertures having internal threads, said internal threads being opposite to each other,
  (c) internal bushing means for engaging each of said threaded apertures, one of said internal bushing means having at least one tab,
  (d) a cylindrical element having at least one notch on one end, said notch and said tab being interconnected,
  (e) means for supporting said cylindrical element between said two internal bushing means, and
  (f) said supporting means being cooperative with said opposite threads and said notch and tab to form means for preventing relative movement between said cylindrical element and said lugs.

7. The combination comprising:
  (a) a pair of spaced lugs,
  (b) first bushing means mounted in at least one of said spaced lugs,
  (c) cylindrical element means positioned between said spaced lugs,
  (d) means for preventing jamming of said bushing means and said cylindrical element means, and
  (e) means for preventing relative rotation between said cylindrical element means and said lugs,
  (f) said rotation preventing means comprising at least tab and notch interconnecting means between said cylindrical element means and one of said bushing means.

8. The combination recited in claim 7 wherein said rotation preventing means additionally comprises:
  (a) means for supporting said cylindrical element means,
  (b) said supporting means comprising nut and bolt means interconnecting said bushing means and said cylindrical element means.

9. The combination recited in claim 7 wherein said rotation preventing means additionally comprises:
  (a) second bushing means mounted in the other of said lugs,
  (b) first threads between said first bushing means and said one lug, and
  (c) second threads between said second bushing means and said other lug,
  (d) said first threads being opposite to said second threads.

10. The combination comprising:
  (a) a pair of spaced lugs, said lugs each having an aperture therethrough, said apertures of said lugs being threaded, and said threaded apertures being oppositely threaded,
  (b) bushing means for engaging each of said threaded apertures, one of said bushing means having at least one tab,
  (c) cylindrical element means positioned between said oppositely threaded lugs, said element means having at least one notch on one end thereof, said notch and said tab being interconnected,
  (d) means for preventing jamming of said bushing means tab and said cylindrical element means,
  (e) means for supporting said cylindrical element means between said lugs, and
  (f) said supporting means being cooperative with said opposite threads and said notch and tab to form means for preventing relative movement between said cylindrical element means and said lugs.

11. A hinge comprising the combination of:
  (a) a pair of spaced lugs, said lugs each having an aperture therethrough, said apertures of said lugs being oppositely threaded, and said apertures being disposed in axial alignment,
  (b) bushing means for engaging each of said threaded apertures, one of said bushing means having a tab and a notch, said notch being contiguous with said tab, and said bushing means notch positioned forward of said bushing means tab with respect to the direction in which said bushing means rotates when said bushing means is threaded into said spaced lug,
  (c) a cylindrical element,
  (d) means for supporting said cylindrical element between said oppositely threaded apertures,
  (e) said cylindrical element having a notch and a tab, said element tab being contiguous with said element notch, said element notch and said bushing means tab being interconnected, said element tab positioned forward of said element notch with respect to the direction in which said cylindrical element rotates after contact of said element tab by said bushing means tab when said bushing means is threaded into said threaded spaced lug,
  (f) said supporting means being cooperative with said opposite threads in said lugs and said notch and tab to form means for preventing relative movement between said cylindrical element and said lugs.

References Cited by the Examiner
UNITED STATES PATENTS

| | | | |
|---|---|---|---|
| 1,099,758 | 6/14 | Nichols et al. | |
| 1,547,759 | 7/25 | Journeay | 151—39 X |
| 1,651,268 | 11/27 | Gilmour | 151—16 X |
| 2,919,942 | 1/60 | Bechtel | 287—96 |

DON A. WAITE, *Primary Examiner.*

MILTON KAUFMAN, *Examiner.*